(12) United States Patent
Hatton

(10) Patent No.: US 6,269,356 B1
(45) Date of Patent: Jul. 31, 2001

(54) COMPUTER SYSTEM PROGRAM FOR CREATING NEW IDEAS AND SOLVING PROBLEMS

(76) Inventor: Charles Malcolm Hatton, 1493 Sandyhook, Wheaton, IL (US) 60187

( * ) Notice: Subject to any disclaimer, the term of this patent is extended or adjusted under 35 U.S.C. 154(b) by 0 days.

(21) Appl. No.: 09/395,425

(22) Filed: Sep. 14, 1999

Related U.S. Application Data

(63) Continuation of application No. 08/063,407, filed on May 18, 1993, now Pat. No. 6,101,490, which is a continuation of application No. 07/734,303, filed on Jul. 19, 1991, now abandoned.

(51) Int. Cl.[7] ....................................................... G06F 17/00
(52) U.S. Cl. ................................. 706/55; 707/4; 707/101; 707/102; 707/514; 707/532
(58) Field of Search .................................. 706/55; 707/4, 707/101, 102, 514, 532

(56) References Cited

U.S. PATENT DOCUMENTS

| | | | |
|---|---|---|---|
| 4,670,848 | 6/1987 | Schramm | 706/62 |
| 4,724,523 | * 2/1988 | Kucera | 707/532 |
| 4,769,772 | * 9/1988 | Dwyer | 707/2 |

(List continued on next page.)

OTHER PUBLICATIONS

Nakamura, et al, "A High–Speed Morpheme–Extraction System Using Dictionary Database," IEEE Proceedings of Fourth Inter. Conf. on Data Processing, Feb. 1988.*

Capraro et al, "Large Knowledge Based Systems: An Efficient Approach", IEEE Proceedings of the Annual AI Systems in Government Conference, Mar. 1989.*

Hsu et al, "Global Information Resources Dictionary (GIRD)" IEEE Proceedings of Rensselaer's Second International Conference on Computer Integrated Manufacturing, May 1990.*

Evans, Steven, "The Total–System of Instruction: A Project Review", Creighton University, 1981.

Primary Examiner—George B. Davis
(74) Attorney, Agent, or Firm—Roper & Quigg

(57) ABSTRACT

A computerized idea generator and problem solver that can receive English language sentences describing a problem to be solved and generate solutions by analogy. The computer uses words in the problem description sentences to obtain information from a database that relates to the type of problem to be solved, for example, animal, plant or human. The computer then uses this information to access analogous information from a second database. The information used can include (1) where a noun in the problem description is categorized in a hierarchy of information within the database, and (2) what purpose or what function is provided by that noun. This information is used to obtain a noun from a second database and a description of how to solve an analogous problem with respect to that noun. The original noun is substituted in the sentence for the second noun to arrive at a solution.

10 Claims, 8 Drawing Sheets

U.S. PATENT DOCUMENTS

| | | | |
|---|---|---|---|
| 4,771,401 | * 9/1988 | Kaufman et al. | 707/533 |
| 4,774,661 | * 9/1988 | Kumpati | 707/3 |
| 4,787,035 | 11/1988 | Bourne | 700/247 |
| 4,805,134 | * 2/1989 | Calo et al. | 707/10 |
| 4,811,207 | * 3/1989 | Hikita et al. | 707/2 |
| 4,841,441 | 6/1989 | Nixon et al. | 706/45 |
| 4,888,690 | * 12/1989 | Huber | 707/4 |
| 4,905,138 | * 2/1990 | Bourne | 395/707 |
| 4,908,759 | * 3/1990 | Alexander, Jr. et al. | 707/101 |
| 4,912,648 | 3/1990 | Tyler | 706/52 |
| 4,928,233 | * 5/1990 | Millis | 345/419 |
| 4,930,072 | * 5/1990 | Agrawal et al. | 707/101 |
| 4,954,958 | * 9/1990 | Savage et al. | 701/202 |
| 5,123,103 | * 6/1992 | Ohtaki et al. | 707/5 |
| 5,153,830 | 10/1992 | Fisher et al. | 707/531 |
| 5,157,668 | * 10/1992 | Buenzil, Jr. et al. | 714/26 |
| 5,182,793 | 1/1993 | Alexander et al. | 706/13 |
| 5,224,206 | 6/1993 | Simoudis | 706/61 |
| 5,255,386 | 10/1993 | Prager | 707/5 |
| 5,276,774 | 1/1994 | Orihara et al. | 706/54 |
| 5,333,313 | * 7/1994 | Heising | 707/1 |
| 5,379,419 | * 1/1995 | Heffernan et al. | 707/4 |

\* cited by examiner

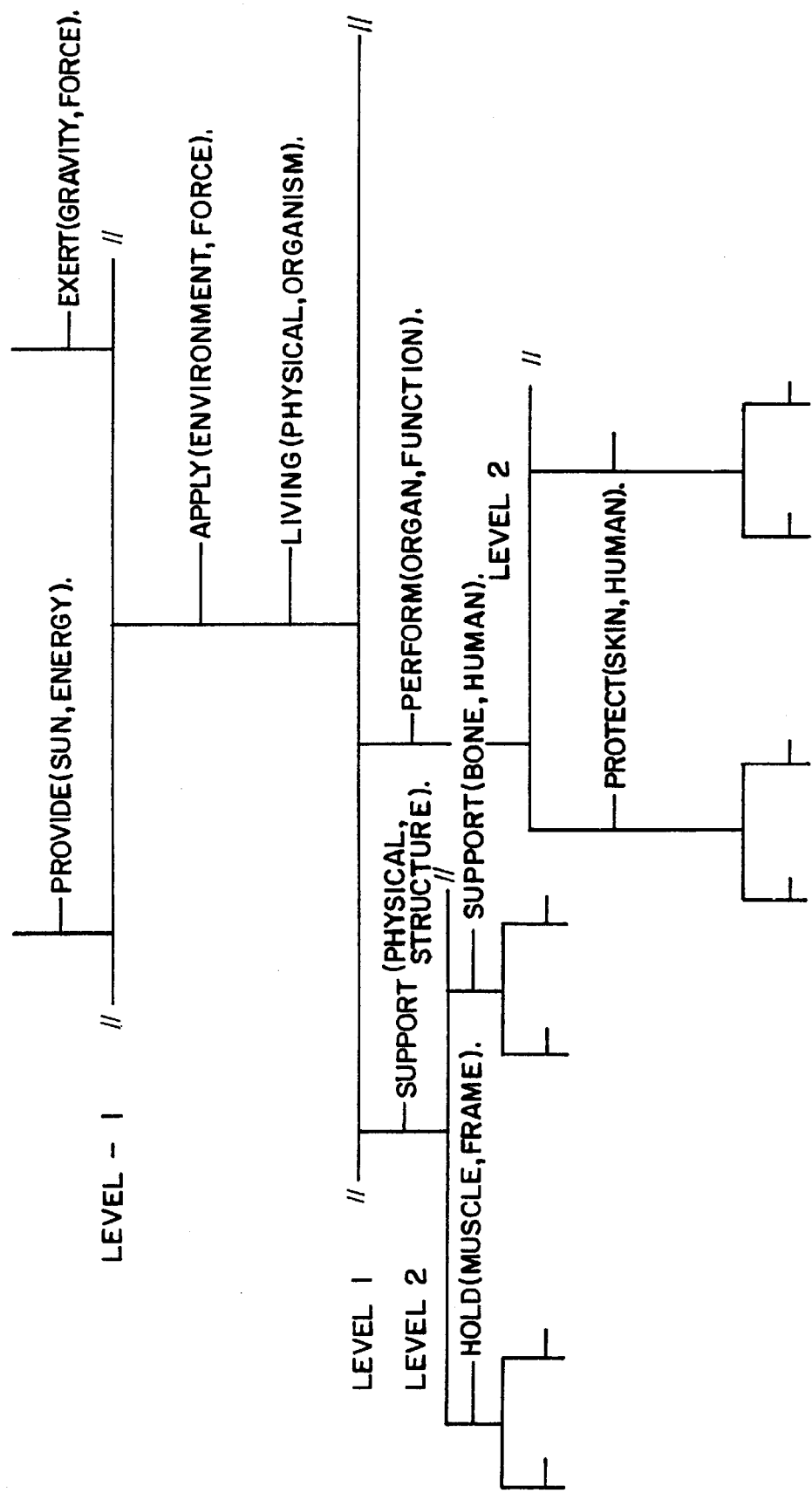

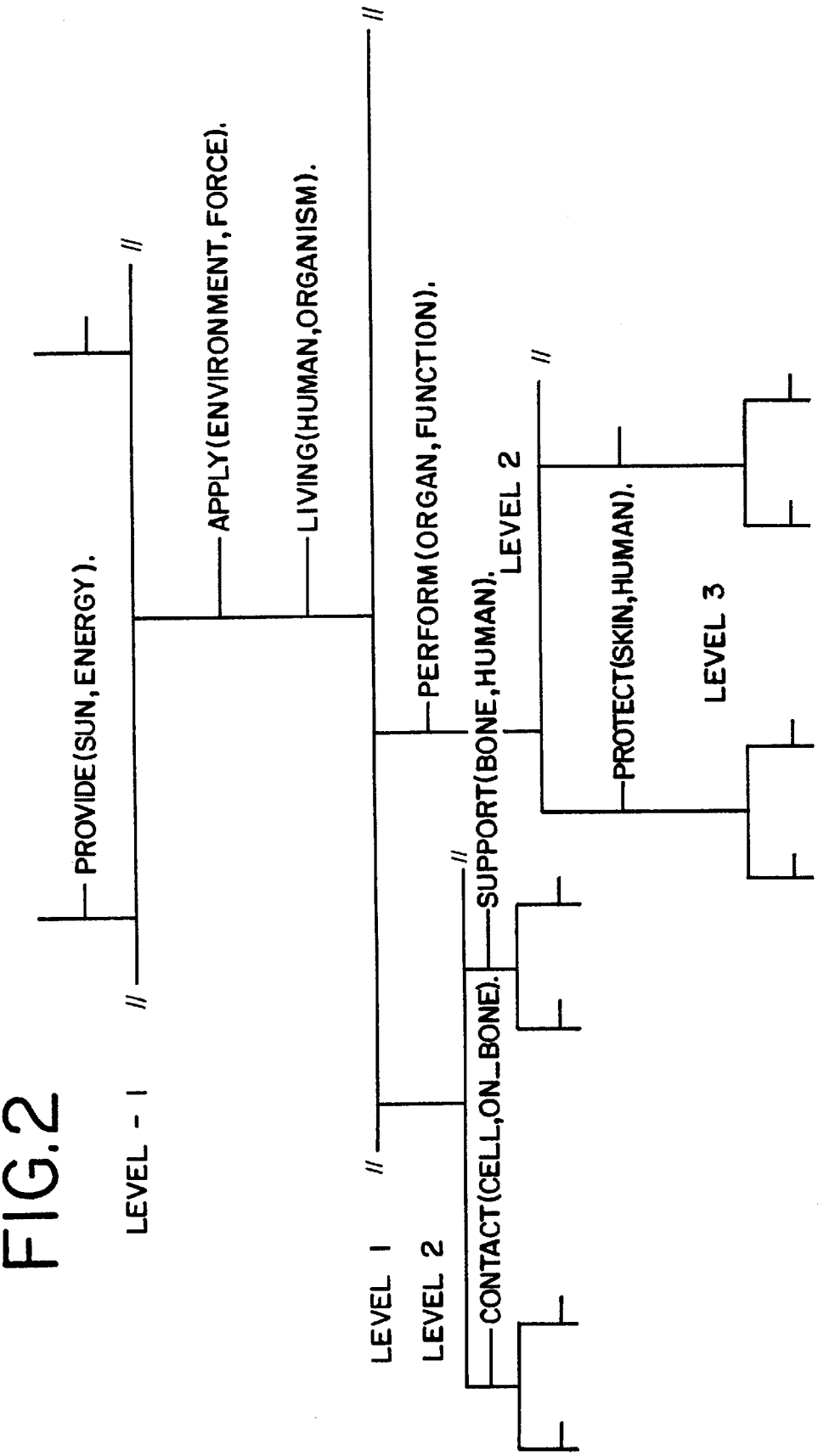

```
/*
VPSN EXPERT BY CHARLES M. HATTON
PATENT DISCLOSURE
```

FIG.3 TREE.EXP (PARTIAL) "EXPERIENCE DATABASE"

```
*/

?-PRIVATE(THIS_FILE_NAME/2).

THIS_FILE_NAME("TREE.EXP",PLANT).

ZERO([TREE,ENVIRONMENT],[0],[LIVING,PHYSICAL,ORGANISM]).

ONE( [BRANCH,TREE],[1], [HOLD,BRANCH,LEAF]).
ONE( [TRUNK,TREE],[1], [SUPPORT,TRUNK,BRANCH] ).
ONE( [ROOT,TREE],[1], [SUPPORT,ROOT,TREE] ).
ONE( [NUTRIENT,TREE], [1], [COLLECT,ROOT,NUTRIENT]).

TWO([VEIN,LEAVE], [2], [DISTRIBUTE,MATERIAL,LEAF]).
TWO([TOP,LEAVE],[2], [CONVERT,PHOTOSYNTHESIS,ENERGY]).
TWO([BOTTOM,LEAVE],[2],[EXCHANGE,CELL,GAS]).
TWO([BOTTOM,LEAVE],["2A"],[EXCHANGE,CELL,WATER]).

TWO( [SUPPORT,BRANCH],[2],[CONNECT,BRANCH,LEAVE]).
TWO( [CONNECT,BRANCH],[2],[CONNECT,BRANCH,TRUNK]).
TWO( [BALANCE,BRANCH],[2],[BALANCE,BRANCH,GRAVITY]).

TWO( [BARK,TRUNK],[2], [PROTECT,BARK,TREE]).
TWO( [SUPPORT,TRUNK],[2], [SUPPORT,TRUNK,BRANCH]).
TWO( [CONNECT,TRUNK],[2],[CONNECT,TRUNK,ROOT]).

TWO( [COLLECT,ROOT],[2],[COLLECT,ROOT,WATER]).
TWO( [COLLECT,ROOT],["2A"], [COLLECT,ROOT,MINERAL]).
TWO([DISTRIBUTE,ROOT],[2],[DISTRIBUTE,ROOT,EARTH]).
TWO( [DISTRIBUTE,ROOT],["2A"], [DISTRIBUTE,ROOT,GROUND]).

THREE([LEAVE,BARK], [3], [CONVERT,LEAVE,ENERGY]).
```

```
/*
VPSN EXPERT BY CHARLES M. HATTON
PATENT DISCLOSURE
```

FIG.4A - HUMAN.EXP (PARTIAL) "EXPERIENCE DATABASE"

```
*/

?-PRIVATE(THIS_FILE_NAME/2).

THIS_FILE_NAME("HUMAN.EXP", ANIMAL).

ZERO([HUMAN,ENVIRONMENTAL],[0],[LIVING,PHYSICAL,ORGANISM]).

ONE([FRAME,HUMAN],[1],[SUPPORT,PHYSICAL,STRUCTURE]).
ONE([ORGAN,HUMAN],[1],[PERFORM,ORGAN,FUNCTION]).
ONE([BLOOD,HUMAN],[1],[TRANSPORT,BLOOD,CHEMICAL]).
ONE([CELLS,HUMAN],["1A"],[BUILDING,SPECIALIZED,BLOCK]).
ONE([CELL, HUMAN],["1B"],[WORKING,SMALLEST,UNIT]).
ONE([CELL, HUMAN],["1C"],[CHANGE,CELL,APPEARANCE]).
ONE([CELL, HUMAN],["1D"],[CHANGE,CELL,CONTENT]).

TWO([MUSCLE,FRAME],["2A"],[CONTRACT,CELL,ON_BONE])
TWO([BONE,FRAME],["2A"],[SUPPORT,BONE,HUMAN]).
TWO([TENDON,FRAME],["2A"],[CONNECT,MUSCLE,BONE]).

TWO([HEART,ORGAN],[2],[PUMP,HEART,BLOOD]).
TWO([KIDNEY,ORGAN],[2],[REMOVE,KIDNEY,URINE]).
TWO([LIVER,ORGAN],[2], [BREAKDOWN,CHEMICAL, BLOOD]).
TWO([SKIN,ORGAN],["2A"], [PROTECT,SKIN,HUMAN]).
TWO([SKIN,ORGAN],["2B"], [PROTECT,HAIR,HEAD]).
TWO([LUNG,ORGAN],["2A"], [SUCKED,GAS,IN]).
TWO([LUNG,ORGAN],["2B"], [PUSHED,GAS,OUT]).
TWO([BRAIN,ORGAN], [2],[CONTROL,MASTER,FACILITY]).
TWO([REPRODUCTIVE,ORGAN],[2],[COMBINE,PARENT, DNA]).

TWO([PLASMA,BLOOD],[2],[CARRY,PLASMA,THING]).
TWO([GAS,BLOOD],[2], [EXCHANGE,BLOOD,GAS]).

TWO([WALL,CELL],[2],[PROTECT,WALL,CELL]).
TWO([NUCLEUS,CELL],[2], [LOCATION,REPRODUCTIVE,CELL]).

TWO([PERIPHERAL,NERVE],[2],[SIGNAL,DECISION,PART]).
TWO([AUTONOMIC,NERVE],[2],[SIGNAL,AUTOMATIC,PART]).
TWO([CENTRAL,NERVE],[2],[CONTROL,BRAIN,HUMAN]).

TWO([BLOOD,CIRCULATION],[2],[MANUFACTURE, BLOOD,SYSTEM]).
TWO([IMMUNE_SYSTEM,CIRCULATION],[2],[PROTECT,PHYSICAL,BODY]).
TWO([BILE,CIRCULATION],[2], [_I_]).

THREE([HAIR,SKIN], ["3A"],[MAINTAIN,HELP,HEAT]).
```

FIG.4B

THREE ([HAIR,SKIN],["3B"],[DISPLAY,HAIR, APPEARANCE]).
THREE([REPAIR,SKIN],["3A"],[TRANSPLANT,SKIN,TO_DAMAGED_LOCATION]).
THREE([REPAIR,SKIN],["3B"],[APPLIED,SYNTHETIC_SKIN,DAMAGED_LOCATION]).

THREE([DNA,NUCLEUS],["3A"],[STRUCTURE,MOLECULAR,CELL]).
THREE([DNA,NUCLEUS],["3B"],[INSTRUCTION,BUILDING,CELL]).

THREE([CEREBRUM,BRAIN],["3A"],[INTEGRATE, BRAIN, PART]).
THREE([CEREBELLUM, BRAIN],["3A"],[COORDINATE,BODY,PART]).

FOUR([CEREBRAL_CORTEX,CEREBRUM],[4],[NOT_DEFINED]).
FOUR([VISION,CEREBRUM],[4],[SHOW,IMAGE,BRAIN]).
FOUR([SPEECH,CEREBRUM],[4],[TOUGH,COMMUNICATE, BRAIN]).
FOUR([HEARING,CEREBRUM],[4],[INFORMATION,AUDIO,BRAIN]).
FOUR([CORTEX,CEREBRUM],[4],[FUNCTION,BASIC,BRAIN]).

FOUR([EQUILIBRIUM,CEREBELLUM],[4], [BALANCE,BODY,PART]).

SIX([THALAMUS,CORTEX],[6],[NOT_DEFINED]).
SIX([HYPOTHALAMUS,CORTEX],[6],[NOT_DEFINED]).
SIX([BASAL_GANGLION,CORTEX],[6],[NOT_DEFINED]).

COMPUTER SYSTEM PROGRAM FOR CREATING NEW IDEAS AND SOLVING PROBLEMS

This application is a continuation of application Ser. No. 08/063,407, filed May 18, 1993, U.S. Pat. No. 6,101,490, which is a continuation of application Ser. No. 08/734,303, filed Jul. 19, 1991, now abandoned.

This invention relates to expert systems and natural language parsers.

BACKGROUND OF THE INVENTION

Expert systems are computer systems that are used to store large amounts of information on a particular topic in a computer database and are designed to respond to queries from a user to provide information about a particular problem. For example, there are expert systems that are used to guide boats through a harbor. Such an expert system contains information in a database that relates to the heights of bridges and the depths of channels in the harbor. A user can query this system on what route it should take with a boat having certain dimensions.

One drawback of these expert systems is that if a user's query asks for information not contained in the data base specifically about that subject, the expert system cannot provide any information. It cannot create ideas and it cannot solve problems by analogy.

SUMMARY OF THE INVENTION

This invention disclosure is about human creativity and problem solving. Its about duplicating human creativity and problem solving using a computer program; and its about telling how this is done so that users can query a computer system for ideas and solutions to their problems.

It is believed that this invention captures the process used by humans to create new ideas and solve problems. It does this by understanding how humans use the English Language to process information by reducing the English Language into actions, subjects, and objects; it understands that the world has many systems that share a tremendous likeness to one another; and, it understands that all system are arranged in an orderly fashion as specified in the hierarchical "Experience Databases."

This invention takes as its input, English Language statements and breaks them down so that they can be processed against "Experience Databases." These "Experience Databases" symbolically represent systems in the world in hierarchical format. This hierarchical format recognizes that most systems are formed by a series of functions and processes. Within each function (a function is made up of processes) is an English like statement formed as an action (verb) and two nouns (subject and object)—See FIG. 1 as an example of verbs and nouns formatted in a hierarchical database structure representing a tree—this is called the tree.exp (experience) database and referred to as an "Experience Database."

In the search for ideas and solutions, this invention sorts an input problem and goal statement in such a way that it can select the appropriate "Experience Databases" to begin the search for an idea or solution. These selected "Experience Databases" serve as a basis to make the correct symbolic substitutions to develop the right analogies so that the correct choice of ideas and answers can be made.

In particular, in one embodiment of the invention, a computer program receives an input statement including a description of the problem and a goal statement. For example, "The beavers destroyed the bark. Save the tree." The computer program determines that the word "bark" represents an object of the verb repair, which is associated with the word "save" in the problem statement. The computer program then looks up the work "bark" in the tree Experience Database. The program determines that the "bark" entry in the tree Experience Database is at the second hierarchical level in the data base and that its function is to "protect" the tree. The program also finds that the tree Experience Database has no "repair" function for bark. The computer program then consults a second data base, for example the human Experience Database. It looks for an entry at the second hierarchical level whose function is to "protect" the human, which is the entry corresponding to "skin". The computer program locates the entry in the human Experience Database that corresponds to the repair function for skin: "Transplant skin to damaged location." The program then substitutes the word "bark" for the word "skin" in the above sentence to result in a solution to the problem: "Transplant bark to damaged location." This solution can then be stored in the tree Experience Database so that if the same problem arises again the computer program will not have to create the solution a second time.

The difference between this invention and others is that it uses verbs and nouns (the world is made of actions and objects) to process information, much as humans do, to create ideas and solve problems using formatted "Experience Databases." It further knows that humans must work subconsciously to understand that by learning one system (economic system for example) it can connect to other systems (using verbs as the connecting factor) to make substitutions and analogies to create ideas and find solutions in other systems (electrical system for example).

This invention is intended to be used by everyone who has the need to create new ideas or solve problems. New ideas or solving problems are dependent on the number of "Experience Databases" at the computer program's disposal. Although, with a limited number of "Experience Databases," results may be less of an idea or solution. This would be analogous to asking a child for answers versus asking an adult.

Unlike other inventions in the field of "Expert Systems," this invention knows how to search unrelated data to find corresponding information that may generate the idea or solve the problem. In this invention disclosure, the computer program generates ideas by finding analogies. The analogy that solves a particular problem is the solution.

This invention is a high level computer program that can create new ideas and solve a broad range of problems. It does this through the word analysis of a user inputted problem statement (an English sentence) and a goal declaration (most often a verb phrase). The computer program analyzes the problem statement and goal declaration looking for key words that fall into the classification of: an Action Maker (subject); an Action (primary verb); and Action Taker (object). Each word (either subject or object) is referenced to dictionary data which has been previously categorized. For example, the word bark is in the plant category and further divided into the sub category of tree.

The word categories are referenced to what is called "Experience databases." Given the problem statement "The beavers destroyed the bark" and "Save the tree," the computer program begins the solution process, through analysis of each word in the problem and goal statements, starting with bark. It finds the relationship "protect-(bark,tree)," read as "bark protect tree," in the (tree.exp) "Experience Database."

To find an analogy or idea, the computer program notes the "protect" verb in the above relation and begins a search of other "Experience Database" looking for this same verb. The Databases that are searched are based on the logical analysis of the problem statement and goal declaration statements. From this analysis, the (human.experience) database is searched looking for a "protect" verb relation. Since there could be many "protect" verb relations within an experience database, the computer program uses a technique called leveling and selects the "protect(skin, human)" relationship, read as "skin protect human" in the (human.experience) database as the analogy to bark. Once the analogy has been determined, the next phase in the solution process begins by looking for things that have to do with skin and repair in the (human.experience) database. The reason the computer program looks for a repair function is based on the analysis of the problem and goal statements. Note that the two words in these statements "destroyed and save" suggest that skin needs to be repaired. But it is not really the skin that needs repair, but bark, and so the computer program makes the appropriate substitution and states that a solution to the problem could be to "Transplant bark to damaged location." This is the solution that was used to save the tree from destruction by the beavers, and is the same solution the computer program proposed as its solution to the beaver tree problem. This method of idea generation and problem solving relies heavily on the computer program's analysis of the problem statement and goal declaration. It works to determine if they make sense and that the goal declaration logically states what must be done in the problem statement to solve the problem.

In the process of idea generation or problem solving using "Experience Databases," the computer program employs methods to categorize each word in the input statements. The problem statement is checked to insure it is a true sentence (must contain a noun and verb phrase) to guarantee enough information is there so that the solution processor can effectively query the "Experience Databases." In detail, the solution processor's job is to insure the problem and goal statements are "semantically correct"—that they logically are in agreement with one another. In fact, logic is employed throughout the idea and problem solving process by the computer program.

A section in the computer program looks at the input information (problem statement and goal declaration) to see if it fits the logic of the world in terms of create and destroys since most things in the world eventually fit into these categories—things are created and then, over time, erode back to the material that created them.

In terms of the problem statement and goal declaration: the computer program defines each word; checks to see that the problem statement complies with the fundamental components of actions and objects (verbs and nouns); semantically checks the logic of the problem statement and goal declaration; searches the "Experience Databases" looking for the same actions and then substitutes, where appropriate, the analogy to create the idea or solve the problem. So analysis, logic, and substitution for analogy are all used by this computer program. In addition, but not detailed in the beaver tree example in this disclosure, is the procedure to solve problems by calculation. In terms of the computer program and its "Experience Databases," pointer verbs and the substitution for analogy would be used to call out the type of mathematical methods that could be used to solve a problem requiring calculations. But far more importantly, would be to develop the hierarchical tree for all categories of math and the functions that make them up so that their pointer verbs and associated nouns could be used as analogies to create ideas and solve other problems.

This invention provides a system that models information ("Experience Databases" are a hierarchical ordering of systems in the universe by functions using a verb, noun subject, and noun object statement) in a format that supports the creation of ideas and the solution of problems by analogy using ordinary English Language input as typed into the computer through the keyboard.

This invention further provides a system to use a defined process (solution processor takes an English Language input problem statement and goal declaration) to select actions (verbs) as the primary mechanism to relate all things (nouns) in the universe, thereby, creating a system to properly emulate human creativity and problem solving using information substitution and analogy.

Any information added in the form of "Experience Databases" can be NON-SPECIFIC and still serve in the process of creating ideas or finding solutions using the software program detailed in this invention disclosure.

This invention provides a system to emulate human creativity and the human problem solving process using a defined "solution processor" as disclosed in this application, and "Experience Databases." An "Experience Database" is a description of any system in the universe formatted as a hierarchical data structure. The tree system (called the tree Experience Database) is shown in FIG. 1 and 3 in this document. FIG. 3 is a partial listing for category "plant" and subcategory tree. It defines the functions of a tree starting at level one. Tree has four level one functions which are all defined as the first argument of one, namely, branch, trunk, root, and nutrient. The process "branch", for example, performs the function [hold,branch,leaf]. The verb "hold" relates branch and leaf. It is read as "branch hold leaf." Any analogy search would look at selected "holds" (based on program logic analysis) to determine if the arguments of this "hold" could be substituted to solve a problem or create a new idea. FIG. 1 details the same information as in FIG. 3, but is shown in a pictorial format. The "Experience Databases" act like real human experience and allow the system disclosed to act in a way that, by adding more "Experience Databases," the system increases its ability to suggest ideas and find solutions.

The invention further provides a system that defines human creativity and the corresponding problem solving process as one that is made up off: a categorized dictionary; a grammar logic system; a semantic logic system; a database search and logic system; and Experience databases as implemented in this disclosure.

This invention further provide that the analogy process for developing ideas or solving problems, based on the details of the process disclosed, can be extended into solving problems by mathematical calculation by including those instructions as part of the data in the "Experience Databases."

The invention still further provides a system that uses "Experience Database" structures as defined in the formatted examples of FIGS. 1,2,3,4A and 4B which can be used to describe all systems in the world. For this invention disclosure, human creativity is defined as the ability to view the world and draw conclusions from existing systems. From these conclusions, one then creates new ideas or develops new solutions to solve existing or hypothetical problems.

In this invention disclosure, the computer program generates ideas by finding analogies. The analogy that solves a particular problem is the solution. To create new ideas or solve problems, this invention disclosure uses logic, substitution, and analogy. It should be noted that the "Experience Databases" can hold instructions to solve mathematical problems as would be defined in the relation [find,area, under_curve] read as "area find under_curve." This then would add another dimension to the human problem solving process by extending the use of the verb pointer, for substitution, to get the analogy which would now include math as a method to calculate a solution to a problem.

BRIEF DESCRIPTION OF DRAWINGS

FIG. 1 is a schematic of the tree Experience Database.

FIG. 2 is a schematic of the human Experience Database.

FIG. 3 is a partial listing of the tree Experience Database.

FIGS. 4A and 4B are partial listings of the human Experience Database.

DETAILED DESCRIPTION

Figure 5:
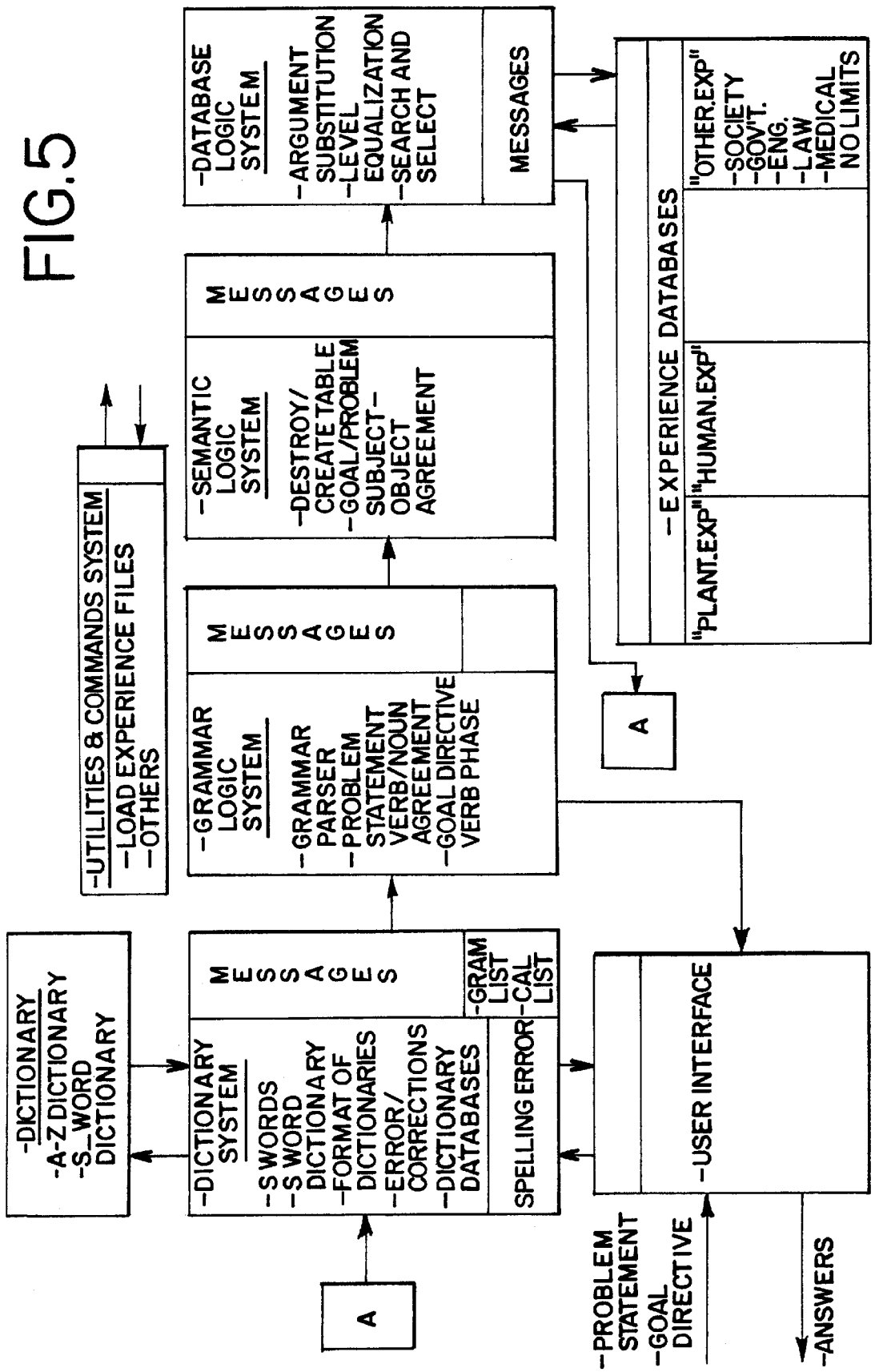
FIG. 5 is a block diagram of an implementation of the present invention.
Figure 6:
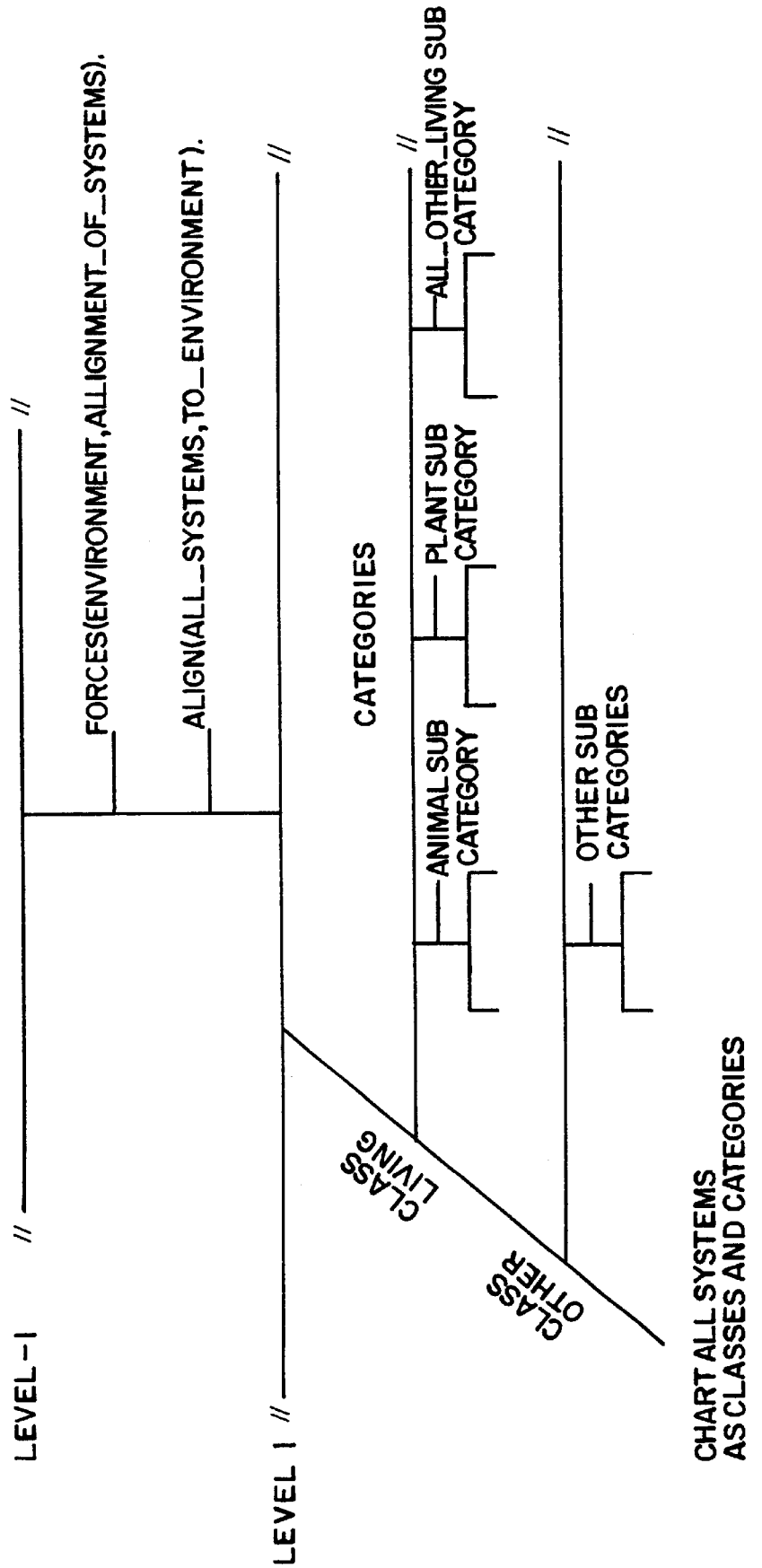
FIG. 6 is a schematic illustrating categories and subcategories useful in the implementation of the present invention.
Figure 7:
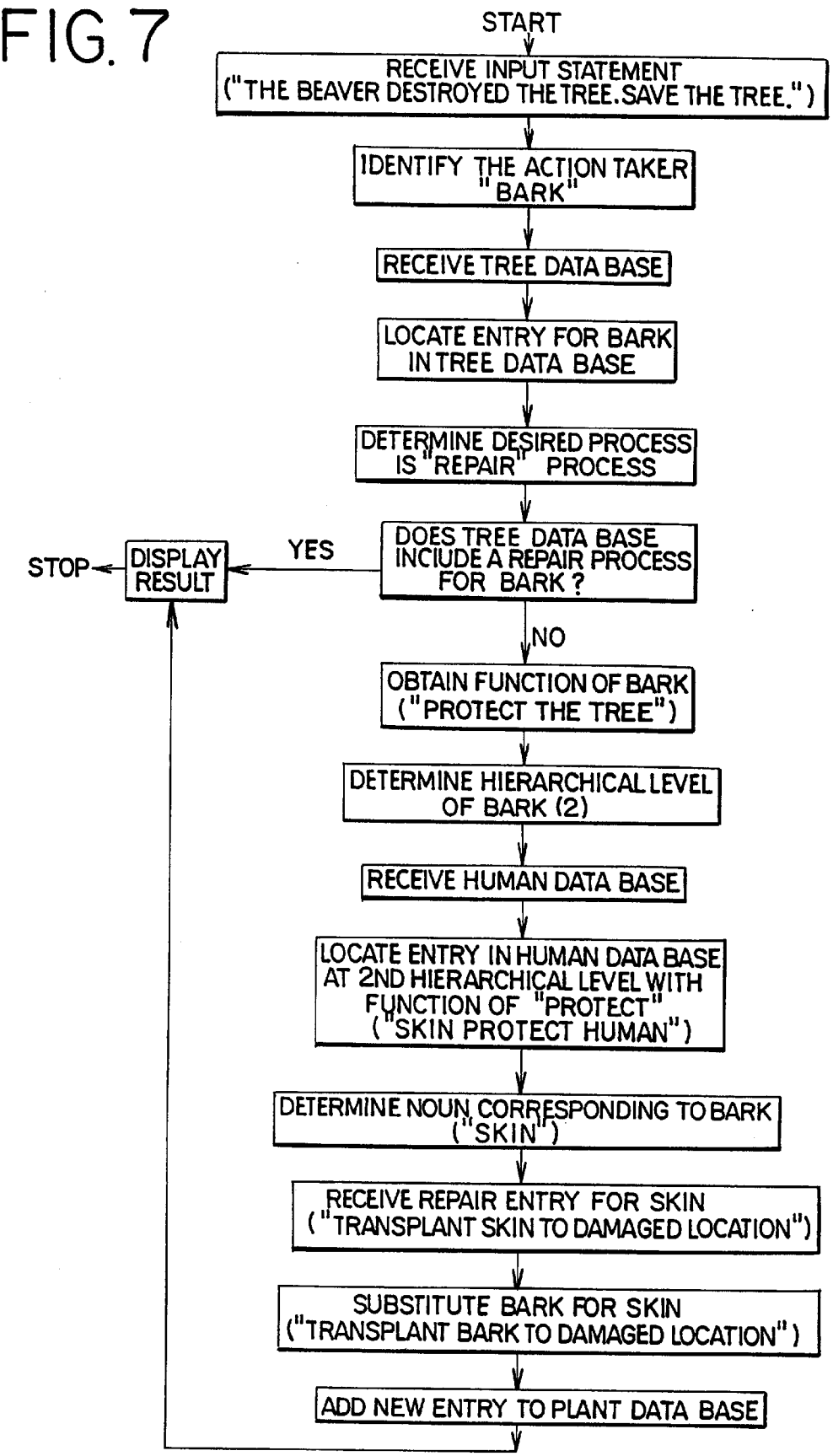
FIG. 7 is a flow chart illustrating the steps of the present method invention.

This software system that makes up this invention is comprised of (see FIG. 5): a User Interface; a Dictionary System and word Dictionaries; a Grammar Logic System; a Semantic Logic System; Database Search and Logic System—referred to in FIG. 5 as Database Logic System; Experience Databases; and a Utilities & Commands System. The key to the way this system works is in the design and theory of the "Experience Databases." In this theory of mine, it is thought that the organization of systems in the universe (world) forces the human brain to organize itself in the same manner so that verbs can be used to relate to different nouns to create ideas and solve problems by substitution for analogy. The rest of the System, except for the Utilities & Commands System, processes the English Language so it can be effectively applied against the "Experience Databases."

This idea for this system came from a problem. This same problem will be used in this disclosure to describe how the invention is used to find a solution. I live next to a small lake. In 1987, several beavers were cutting down trees which populate the shore line and protect it from shore line erosion. When beavers cut down trees, it's done in phases.

In the first phase, the beaver would remove the bark at the base of the tree; in the next phase, the tree would be notched on the side the tree was to fall; and in subsequent phases the tree would be cut down. One night in the fall of 1987, a tree I was hoping would not be cut down lost its bark in the first phase of a beaver attack. It seemed that there was no reason to hope that the tree would live once the bark had been removed from the circumference of the tree since destroying bark in this manner kills a tree.

For whatever reason, I decided to cut long strips of bark from the upper parts of the tree and transplant them to the damaged area. Next spring, I was shocked to see that the tree was alive with new leaf growth. Over the next 3 plus years, I developed some theories and implemented a general purpose software system to solve this and other problems.

The key component to this general purpose problem solving system lies in the "Experience Databases". (See FIGS. 1 and 2.) This is new and novel and ties together this system's unique ability to generate ideas or solve any problem using these database structures and the search processes employed in this software program. From the logical analysis of the input statements, the program decides which "Experience Database" to search to find its answers. The search mechanism within this software program must have databases organized in such a way that it lends itself to the selection of the appropriate answer(s). The database is organized based on actions or verbs that tie all the nouns together in the world - this tying together of all the nouns by verbs is done by a hierarchical system of databases for each category. For example, tree is a sub category of category plant and the beaver tree problem is solved, in part, by using the tree.exp database. What causes analogy to serve as a basis for problem solving is predicated on the fact that all systems in the universe form under some sort of force. Across each system as in plants and animals is the common forces of nature. In the case of plants and animals, as one example, you would have the force that causes each system to protect (verb) itself against the force of weather. The protective device is bark and skin respectively. In the case of the "beaver tree problem" (as it will be referred to throughout this document) each system, plant and animals alike, are forced to develop similarly. These similarities are apparent if one were to break down plants and animals (in this case) in a hierarchical structure using functions and processes. In FIG. 1—tree.exp, a tree has a function called "support(trunk, bark)." It is made of a process called "protect(bark,tree)" and others that are not shown. Likewise, in FIG. 2—human.exp, a human has a function called "perform(organ,function)" and has as one of its processes a function called "protect (skin,human)." These two functions: "protect(bark,tree)" and "protect(skin,human)" occur at level 2 in the hierarchy for both the ("Tree.exp",plant) and ("human.exp" ,animal") "Experience Databases." The format for any level in an "Experience Database" is:
Level_in_hierarchy([Child,Parent],[Numeric_Level_in hierarchy],[Verb,Noun_Subject, Noun_Object]). So for example, "protect(bark,tree)" can be read as "protect(Verb) (bark(Noun_Subject),tree(Noun_Object) )" and "protect (skin,human)" as "protect(Verb) (skin(Noun_Subject), human_object)). These can be rewritten to appear more like English sentences as in: "bark protect tree" and "skin protect human." These "Experience Databases" were devised in such a way as to allow the software program to search for answers based on the organization of systems and their likeness to each other. The theory states that if you break up systems in a hierarchical format, as functions and processes, you will find the same verbs at or near the same level in the hierarchy across different "Experience Databases." What this further shows is that the verbs, in this case "protect", can be found in both the "tree.exp" and "human.exp" databases at level 2. This then being the case, it could be said that nature has made nouns (bark and skin) analogous to each other because they are tied together by the common verb protect under the common force of weather. It would further suggest that a solution in a particular system may be applied to another system through its analogies. These analogy substitutions are not just limited to verbs like "protect" being at the same level in a hierarchy, as in FIGS. 1, 2, but also for "protects" that may occur at different levels or within other categories because nature tends to also duplicate functions at different levels across or within the same system as in the plant and animal systems. Note that "protect" is a function and could have many different arguments (nouns). It may be that "protect(paint,car)", in addition to "protect(bark,tree)"

and "protect(skin,human)", could be used to solve the "beaver tree problem." What "protects" that gets used by the system to solve problems is determined by the analysis of the problem statement and goal declaration statement.

In summary and up to this point, we were given the information that a beaver destroyed (removed) the bark from around the base of a tree. If gone untreated, the tree would die. An idea was tried and strips of bark (grafting) were placed across the area of removed bark which proved to be a method to save the tree from dying. The method by which this problem was solved, using some theories on the structures of systems and the way the human brain may solve problems, was implemented in a computer software program. Part of the way the software program goes about solving this problem is by analysis of the problem statement (The beaver destroyed the bark) and the goal declaration statement (Save the tree). There is a lot of sentence processing by the software program, but it eventually leads to the "Experience Databases" for plants and animals. It focuses in on two key parts of the Experience data and starts by isolating this information in the plant "Experience Database" (tree.exp) and homing in on the function identified as "protect(bark,tree)." It then looks for the "protect" verb in the (human.exp) database and finds "protect(skin,human)" noting that this also occurs at Level 2 in the hierarchy. (See FIGS. 1 and 2.) The software program will now assume that "bark" and "skin" are analogous (because of the pointer verb "protect" and because they are both at the same level in their respective "Experience Databases") and begin a search in the (human.exp) database looking for a repair function for skin (because the software program knows bark was destroyed and it must be repaired by the goal declaration: Save the tree). (Also note that the software program knows that "bark" in the problem statement and "tree" in the goal declaration come for the same category "plant" as defined in dictionary of this system.) When it finds a repair function in the "human.exp" database for skin (see FIG. 4B—data item starting with three ([repair,skin . . . , it will substitute bark for skin (because of the common verb "protect") and solves the "beaver tree problem" by suggesting:

"transplant bark to damaged location." The rest of the program description that follows details each step in solving the above problem.

This general purpose idea generator and problem solver requires two inputs. The first is a "problem statement" that must be grammatically correct with both a noun phrase and a verb phrase. The second is a "goal declaration" (action or verb phrase) that must tell the computer program what the user wants done with the problem statement. For example, in the "beaver tree problem," the two entries would be:

problem statement:
1A. The beavers destroyed the bark.
goal declaration:
2A. Save the tree Once these two entries have been typed into the computer, the software program can begin its processing. The first action that is taken is to find the plural words and remove the s ending of each plural word. Words that are not plural are checked in a special s word dictionary. So for example, the word "has" would not have its s removed. All words ending in s, that are plural, must have their s's removed since the dictionary contains only words in their singular noun form. The problem statement from above would have the s removed from "beavers" and be displayed on the CRT (Cathode Ray Tube) as:

1B. The beaver destroyed the bark.

Next, each word in both the problem statement (The beaver destroyed the bark.) and the goal declaration (Save the tree) is checked in a dictionary for correct spelling. Each word in the dictionary has the following format:

2B. dictionary_file_name(Word,Grammar, Word_Length, Category,Comment).

So, for the word "beaver" the dictionary data would look like this using the above format (using item 2B above):

3B. bdic(beaver,cn,6, animal,none).

This says that the word "beaver" was found in the bdic (stands for b dictionary) and is spelled as beaver; it is a common noun (cn); has 6 letters; is of Category animal; and, has no comments. Each word in both the problem statement and goal declaration statement is retrieved from the dictionary and stored in computer memory. At the completions of the this process, the program displays the following, on the CRT, for the user. (Note: that misspelled words are corrected before this point in the display):

1C. tdic(tree,cn,plant,4,none).
2C. tdic(the,detthe,n,3,none).
3C. sdic(save,vi,n,4,none).
4C. bdic(bark,cn,plant,4,none).
5C. tdic(the,detthe,n,3,none).
6C. ddic(destroyed,vtb,n,9,none).
7C. bdic(beaver,cnp,animal,6,none).
8C. tdic(the,detthe,n,3,none).

Note that the word beaver in item 7C above has been changed from cn to cnp. Since all words in the dictionary are singular (nouns), beaver was changed to cnp (common noun plural) to reflect the word "beavers" in the problem statement—see line item 1A above. The dictionary words have three main purposes in solving problems. First, it is important for the system to identify each word Category. For example, the word bark is identified as Category "plant" as defined by the dictionary—see 4C above. The system must know this because it will go to the ("tree.exp", plant) "Experience database"—(FIG. 3) and begin to look through the hierarchical statements beginning at level 0 (first entry is: zero([environment, tree],[0],[living, physical,organism]) looking for the word "bark" where "physical" is now. This does occur within (FIG. 3) at level 2 and is identified as:

1D. two([bark,trunk],[2],[protect,bark, tree]).

Note that 1D. above is only used to identify this line and does not appear as part the ("tree.exp" plant) "Experience Database." The first stage in the "analogy process" has been accomplished and the software program stores the word "protect" along with its two arguments; bark and tree. This will be shown later on in this disclosure, but its important to note that "bark" is understood, by program logic analysis, that it got "destroyed" and that the goal declaration statement wants the "tree" to be "saved." This being the case, and the "bark" needs to be repaired, its important to understand what function "bark" serves as identified by the ("tree.exp", plant) "Experience Database." As was stated, "bark" is identified as having the function "protect(bark,tree)" and is formatted such that "protect" is the verb; "bark" is the noun subject; and "tree" is the noun object. It can be read as "bark protect tree" but is formatted as "protect (bark,tree)" because the verb "protect" needs to show that it is the relation that "glues" all noun subjects and objects together. Remember that the verb "protect" occurs across all categories and sub categories unlike its noun counterparts - this is partly what makes solving problems by analogy possible.

The second item of importance in the dictionary is the word types, i.e., noun, verb, etc. For example, the dictionary shows "destroyed" as below:

1E. ddic(destroyed,vtb,n,9,none).

We note, in this case, that destroyed is a vtb (verb transitive both (could be "both" a noun and a verb)), and states the word "destroyed" is found in the ddic (d dictionary); is spelled as "destroyed"; is a verb transitive b, and understood to be plural in form (even though it does not end in s); has n (no) Category; has 9 letters; and has "none" comments.

In summary, the computer program looks at the problem input and goal declaration statements and checks to see that the words that make them up are in the system dictionary. If there are words ending in s, the s is removed, except for non plural s words. Each word is then checked in the dictionary database and information regarding proper spelling, grammar, category, and length is stored in computer memory. The existing dictionary grammar data is modified (dictionary data is always singular) to reflect any words in the problem statement or goal declaration statements that are plural. After all the words in the problem and goal declaration statements are checked, modified to show singular or plural forms, the program makes three types of list structures. The first list structure (a list is a list of words held in square brackets and separated by a comma) is a list of the problem and goal declaration statements appended together and looks like this:

1F. [the,beavers,destroyed,the,bark, save,the,tree].

If the above list had miss spellings, it would be displayed below showing the correct spelling as:

2F. [the,beavers,destroyed,the,bark, save,the,treel.

Note that this is the same list since iF above did not have any spelling errors.

The second list the computer program displays for the "beaver tree problem" is a list of grammar words for the problem statement and the goal declaration statement. For words that are plural, a (p) is appended to the grammar word (as in beaver=common noun=cn versus beavers=common noun plural=cnp) to show that is was plural in the problem or goal statements. This is done so that the computer program can check verb noun agreement in the user input statements as in "The beavers destroys the bark"—grammatically wrong versus "The beavers destroy the bark"—grammatically correct. To see how this works note 3F below and the cnp which stands for "beavers" in the problem statement "The beavers destroyed the bark."—its grammar word sentence equivalent is:

3F. [detthe,cnp,vtb,detthe,cn].
where:
4F. detthe=the=determiner
5F. cnp=beaver=common noun plural (cnp reflects s for beavers in the original problem statement—see 1A)
6F. vtb=destroyed=verb transitive both
7F. detthe=the=determiner
8F. cn=bark=common noun and for the goal declaration statement: "Save the tree" its grammar word sentence equivalent is:
9F. [vi,detthe,cn] where:
10F. vi=save=verb intransitive
11F. detthe=the=determiner
12F. cn=tree=common noun and the last of the three lists shows the category sentence equivalent for the "beaver tree problem." The category sentence for the problem statement [The beavers destroyed the bark] is:
13F. [n,animal,n,n,plant] where:
14F. the=n=no category
15F. beavers=category "animal"=sub category "mammal"
16F. destroyed=n=no category
17F. the=n=no category
18F. bark =category "plant"=sub category "tree" and the category sentence equivalent of the goal declaration statement [Save the tree] is:
19F. [n,n,plant] where:
20F. save=n=no category
21F. the=n=no category
22F. tree=category "plant"=sub category "tree"
In summary, there are three lists. They are:
23F. The word List:
A. [the,beaver,destroyed,the,bark, save,the,tree].
24F. The grammar Lists:
A. [detthe(the),cnp(beaver),vtb (destroyed), detthe(the), cn(bark)]
B. [vi(save),detthe(the),cn(tree)].
25F. The category List:
A. [n,animal,n,n,plant]=problem statement
B. [n,n,plant]=goal declaration statement After the above lists (23F,24F,25F) are formed, the computer program checks verb noun agreement (morphology) by applying grammar rules to the list in 24F item A and B above. In addition, the grammar sentence (for the problem statement 24F item A) is checked for a noun and verb phrase. The grammar declaration statement (24F item B) is checked for a verb phrase only and no check is made for noun verb agreement since it is not a true sentence in that it may not contain a noun phrase. The purpose of the goal declaration statement is an action only statement (verb phrase) and directs the computer program to solve the problem statement in a particular way. What particular way it does this is checked using semantic logic to insure that action (goal declaration verb phrase) is in agreement with the meaning of the problem statement.

An important function of the "grammar logic system" is to ensure it accurately identifies the primary verb. If the primary verb is identified in the dictionary system as having the possibility to be used as a verb or noun in the sentence, the "grammar logic system" will properly identify the word type for that sentence. For example, the word love can be either a noun or verb depending on how its used in the sentence. The computer program properly identifies the word types by forcing all words (in the problem statement) to fall into a noun verb phrase format. This is based on the theory that for a sentence to be a sentence it must have a noun and verb phrase. The goal declaration statement is checked for a verb phrase only. The "grammar logic system" looks for the goal declaration statement's primary verb and stores it. Another important function of the "grammar logic system" is its ability to identify functionally equivalent problem and goal declaration statements. For example, the computer program has to identify that the problem statements "the beavers destroyed the bark" and "the bark was destroyed by the beavers" are functionally equivalent. This allows for variations in stating the problem and goal declaration statements and helps to insure the computer program returns the same solutions regardless of who describes the problem to the computer.

The "grammar logic system" displays the following on the CRT:
Problem statement grammar analysis:
Morphology=plural
Det=detthe(the)
Adj=__12316
Prep=__12320
Noun=cnp(beaver)
Pnoun=__12328
Adv=__12332
Verb1=__12340
Verb(Primary)=vtb(destroyed)

Adj1=__12348
Prep1=__12352
Det1=detthe(the)
Noun1=cn(bark)
Pnoun1=__12360
The problem statement's nouns and verbs agree.
Problem Grammar Sentence (Action) Analysis:
26A. Action Maker: cnp(beaver)
27A. Action: vtb(destroyed)
28A. Action Taker: cn(bark)
Goal declaration statement analysis:
Verb=vi(save)
Adj1=__13374
Prep1=__13378
Det1=detthe(the)
Noun1=cn(tree)
Pnoun1=__13386
The goal declaration statement is a verb phrase.
Goal Declaration Statement (Action) Grammar Analysis:
29A. Action: vi(save)
30A. Action Taker: cn(tree)

The numbers assigned to a word type as in (Adj1=__13374) above simply means that the variable Adj1 represented by __13374 was not assigned a value (the name of the adjective) since the goal declaration statement (Save the tree) did not contain an adjective.

The problem and goal declaration statements are broken down into Action_Maker, Action, and Action_Taker (see 26A, 27A, 28A, 29A, and 30A above) by the computer program. These then become the lowest common denominator in all problem and goal declaration statements, and allow the computer program to process similar problem and goal declaration statements in the same fashion so as to guarantee the same results (answers). It further identifies who (noun subject) caused the action and who (noun object) received the action. Time and state verbs are discounted as not having a legitimate place in the interaction between nouns because its more difficult to describe any changes to noun subject or object. It is certainly possible to include rules (in the current computer program) that would account for any effect they may have on nouns. In general, adjectives and adverbs are also currently discounted, but in a rule based system, as this one is, it's relatively easy to add rules to address their effect on nouns, pronouns, and verbs.

The work done by the "grammar logic system" above is essential for two primary purposes. The first, is to look at things in terms of objects and actions in both the problem statement and the goal declaration statements. By classifying these objects and actions it will make it possible for the "semantic logic system" to analyze the meaning of the problem and goal declaration statements to see if they "logically agree" with one another. If for example, the problem statement was "The beavers destroyed the bark" and the goal declaration statement was "Save the sky" instead of "Save the tree", it could suggest that the goal declaration statement was not logically related to the problem statement. The second reason the work done by the "grammar logic system", up to this point, is essential, is because it properly classifies the Action_Maker, Action, and Action Taker for the search functions defined and executed in the "database search and logic system." For example, the Action Taker in the "beaver tree problem" problem statement is "bark." The "database search and logic system" has to know that it must FIRST go to the "tree.exp" database and find the verb associated with bark i.e.; "protect."

Once the Action_Maker, Action, and Action_Taker have been identified-for both the problem statement and goal declaration statements, the computer program passes information from the "grammar logic system" to the "semantic logic system." The "semantic logic system" puts the following message on the CRT for the "beaver tree problem:"
Semantics:
1H. beaver destroyed bark
2H. goal statement directive is to repair bark These statements are a result of an analysis of the words identified as the Action_Maker, Action, and Action_Taker in the problem statement "the beavers destroyed the bark" and the word identified as the Action and Action_Taker in the goal declaration statement "save the tree." (See 26A–30A above). In the "semantic logic system" for the "beaver tree problem," a check is made to insure the goal declaration statement word "save" for "save the tree" agrees with the "destroyed" word in "the beavers destroyed the bark" problem statement. Semantically, it would make sense to "save" what has been "destroyed." Further analysis looks at the category sentences for each word. Note 25F A and B above. The last word in each list is the word "plant." In the dictionary, the words "bark" from "the beavers destroyed the bark" and "tree" from "Save the tree" both are related to "plant" as defined in 18F and 22F above. The "semantic logic system" knows that "bark" was destroyed and is a plant; and "tree" is also a plant from "save the tree"; and both "bark" and "tree" represent the same logical thing in the problem and goal statement for the "beaver tree problem."

In addition, the "semantic logic system" does further analysis of the problem and goal declaration statements to determine if the goal declaration wants to remove the "beavers" as another possible solution to the "beaver tree problem." The "semantic logic system" passes semantic logic to the "database search and logic system" and in a way tells it how it should search the "Experience Databases." For example, the "beaver tree problem" gets its solution from the "human.exp" database and is told to do this by the "semantic logic system." The reason this is so is because as a sub category, humans have had the most research dollars spent on them to find cures for their ailments. So it would make sense to consult the human.exp database to look for ways to fix their skin problems noting that skin and bark are related through the verb "protect." One way to fix skin problems on people is to transplant skin which is a data item in the "human.exp" database.

The "semantic logic system" transfers two important pieces of information to the "database search and logic system." The first is the "search list" and the second is the "seed word" based on the semantic analysis of the problem and goal declaration statements for the "beaver tree problem." The "database search and logic system" isolates the word "bark" knowing that the "semantic logic system" defined it as the Action_Taker in the problem statement based on analysis of the problem and goal declaration statements. The "database search and logic system" begins a search through the "tree.exp" database looking for the bark function and finds "protect(bark,tree)". (See FIG. 1.) It then stores the list of words (protect,bark,tree] and uses the word "protect" as the analogy word for the next database search. The next database search has been defined by the "semantic logic system" in its analysis of the "beaver tree problem." It passes the "search list" that contains its guesses of other "Experience Databases" to search for the analogy to "protect." It begins its search in the "human.exp" (experience) database looking at level 2 in the hierarchy and finds "protect(skin,human)." At this point, the computer program displays the following information to the user on the CRT:

1J. The verb pointer is: protect
2J. Pivot Subject is: bark
3J. Pivot Object is: tree
4J. First Analogy Subject is: skin
5J. First Analogy Object is: human Based on prior analysis by the "semantic logic system" the "database search and logic system" looks for a "skin repair" function within the "human.exp" database that relates skin and repair. It finds one (See FIG. 4B level 3):

6J. three([repair,skin],["3a"], [transplant,skin,damaged location]) and substitutes the word bark for skin in the repair database statement ie; [transplant,skin, damaged_location] and the analogy solution becomes (transplant,bark, damaged_location]. The computer program then displays the following solution:

1K. A possible solution to "The beaver destroyed the bark" problem is:
Transplant bark to damaged location.

What is claimed is:

1. A system for solving problems, comprising:

(a) means for receiving an input statement that identifies a problem to be solved;

(b) means for receiving a first data base that contains information relating to a first system and that relates to said problem to be solved;

(c) means for receiving a second data base that contains information relating to a second system;

(d) means for obtaining data from said second data base;

(e) means for substituting data relating to said input statement into the data from the second data base;

(f) means for generating an output statement from the data from the second data base modified by substitution and (g) means for modifying the contents of said first data base using said data from said second data base so that subsequently whenever the system receives the same input statement as received in step a, the output statement is generated from data in the first data base.

2. The system of claim 1, wherein said input statement consists of English language sentences.

3. The system of claim 1, further comprising means for displaying said substituted process data to a user.

4. The system of claim 1, further comprising,
means for locating an entry in said first data base that corresponds to at least one word in said input statement; and wherein said means for substituting data comprises means for substituting said word into said data from said second data base.

5. The system of claim 4,
wherein said input statement comprises at least one sentence describing the problem and at least one sentence describing a goal,
wherein said at least one word in said input statement identifying the object of a verb is related to a word that is part of said at least one sentence identifying a goal;
and further comprising:
means for determining a desired process to be applied to said object that will occur when the problem is solved; and
means for determining that said process has no associated entry in said first data base.

6. The system of claim 5, wherein said at least one sentence identifying a goal comprises an imperative sentence.

7. The system of claim 5, further comprising:
means for identifying in said at least one sentence describing the problem a verb phrase having associated therewith an action;
means for identifying in said at least one sentence an object of said action;
means for determining whether said object in said at least one sentence identifying a goal, and said object of said action in said at least one sentence describing the problem both have associated entries in the same data base.

8. The system of claim 1, further comprising means for adding said substituted process data to said first data base.

9. The system of claim 8, further comprising means for determining the hierarchical level of said entry in said first data base and wherein said means for obtaining data from said second data base obtains said data at said hierarchical level in said second data base.

10. The system of claim 1, wherein each means is implemented on a computer using computer software.

* * * * *